June 12, 1928.

W. H. THOMPSON

HOG RING

Filed May 23, 1927

1,673,129

Inventor

W. H. Thompson

By Earl M. Sinclair

Attorney

Patented June 12, 1928.

1,673,129

UNITED STATES PATENT OFFICE.

WAYNE H. THOMPSON, OF GRAND JUNCTION, IOWA.

HOG RING.

Application filed May 23, 1927. Serial No. 193,513.

The principal object of this invention is to provide nose rings designed to be secured to the snout of the animal to prevent rooting, fence-lifting, chicken eating, or in case of a vicious animal attacks upon others in the same field or pen.

More specifically, the object of this invention is to provide an anti-rooting device having a ring designed to be secured in the rooter portion of the snout, a second ring designed to be secured in the cartilage between the nostrils and a link secured to and connecting the two rings.

A still further object is to provide an anti-rooting device that may be secured to the snout of the animal without the use of special ringing tools.

A still further object of this invention is to provide nose rings for hogs that will not easily tear out and will permit the animal to eat out of a self-feeder without discomfort.

A still further object is to provide an anti-rooting device for animals that is economical in manufacture and durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

One of the biggest problems of hog raisers is the preventing of hogs rooting and fence-raising. The ordinary single ring placed in the rooting portion of the snout is not effective and due to this portion being mostly gristle and therefore not very sensitive, the hog soon loses the ring. If the ring is placed in the sensitive cartilage between the nostrils, the hog may still root and raise fences without much discomfort. I have overcome all of these objections as will be appreciated by those familiar with the art.

Figure 1:
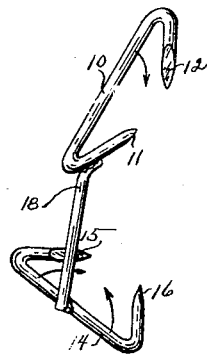
Fig. 1 is a perspective view of my complete invention with the rings in open position ready to be secured to the snout of a hog.
Figure 2:
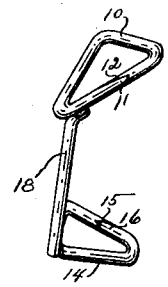
Fig. 2 is a perspective view of my anti-rooting device with the rings in a closed position.
Figure 3:
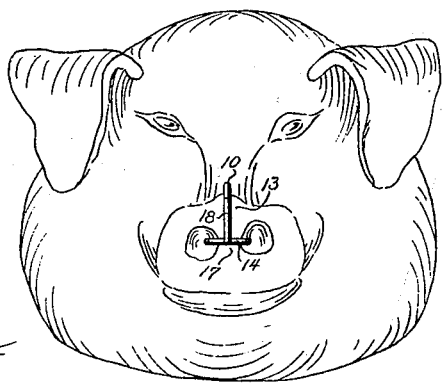
Fig. 3 is a front view of my invention secured to the snout of a hog.
Figure 4:
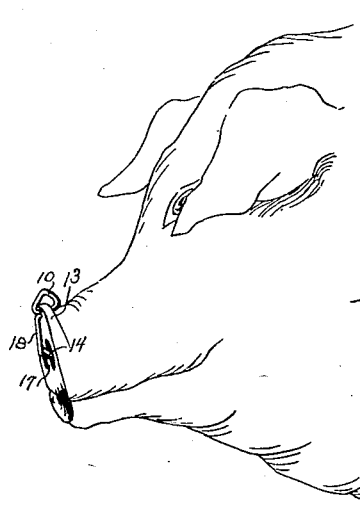
Fig. 4 is a side view of my device secured to the snout of a hog.

I have designated the top nose ring of my device by the numeral 10 which may be of any desired contour so long as it is substantially ring-shaped. The member 10 terminates in reversely disposed and oppositely sharpened or beveled extremities 11 and 12. This top ring is designed to be secured to the rooter portion 13 of the snout as shown in Figs. 3 and 4. The lower ring of the device is designated by the numeral 14 having the sharpened points 15 and 16 and is an exact duplicate of the upper ring. This lower ring is designed to be secured in the sensitive cartilage 17 between the nostrils of the animal as also shown in Figs. 3 and 4. These two rings are permanently secured to each other by the connecting link 18 by electric spot welding or other suitable means. By this construction, the upper ring will be in approximately a vertical plane while the lower ring will be in approximately a horizontal plane. It should be noted that the link 18 is secured to the under side of the bottom prong of the upper ring. This construction is to permit the upper ring to be easily closed by the ordinary hog ringer tool.

Any movement of either ring relative to the snout of the animal will affect the other ring to the discomfort of the animal, thereby dampening any desires he may have to root or raise fences. By the link being rigidly secured to both of the rings, they will always be held in the proper vertical and horizontal planes respectively. This is especially so of the upper ring as it is always held in a position extending some distance above the rooter portion.

The device may be placed on the snout of an animal as easily as the placing of the ordinary hog rings and once secured to the snout, the animal will be sensitive enough to the device that he will not readily tear the same from his snout and lose it.

Hogs of different sizes require different sizes of my anti-rooting device but this is easily accomplished by merely making the links 18 of various lengths.

Although the device will break the animal of the habit of chicken eating and in the case of vicious hogs attacks upon others in the same pen, it does not interfere in the least with eating out of self-feeders.

It will readily be understood by those skilled in the art that I have provided a durable and efficient anti-rooting device for hogs and the like.

Some changes may be made in the construction and arrangement of my improved hog rings without departing from the real spirit and purpose of my invention and it is my intention to cover by my claims any modified forms of structure or use of mechanical equivalents which may be reasonably included within their scope.

I claim—

1. In a device of the class described, a nose ring having oppositely disposed inturned piercing ends designed to be secured in the rooter portion of the snout, a second nose ring having oppositely disposed inturned piercing ends designed to be secured in the cartilage between the nostrils, and a link rigidly connecting said two rings and arranged substantially perpendicular to the central portion of the second named ring.

2. In a device of the class described, a blank for nose rings having inturned piercing ends designed to be secured in the rooter portion of the snout, a second blank for nose rings having inturned piercing ends designed to be secured in the cartilage between the nostrils, and a link rigidly attached to said two blanks.

3. As an article of manufacture, a blank for nose rings having oppositely disposed inturned piercing ends designed to be secured in the rooter portion of the snout, a second blank for nose rings having oppositely disposed inturned piercing ends designed to be secured in the cartilage between the nostrils, and a link having one of its ends secured to and in the same plane with the first mentioned blank and its opposite end secured to and in a transverse plane to that of the last mentioned blank.

4. As an article of manufacture, a blank for nose rings having oppositely disposed inturned piercing ends designed to be secured in the rooter portion of the snout, a second blank for nose rings having oppositely disposed inturned piercing ends designed to be secured in the cartilage between the nostrils, and a link having one of its ends secured to and at a point in close proximity to one of the piercing ends of the first mentioned blank, and its other end secured to the last mentioned blank and at a point approximately equal distance from its two piercing ends.

WAYNE H. THOMPSON.